US012683083B2

(12) United States Patent
Jhun et al.

(10) Patent No.: US 12,683,083 B2
(45) Date of Patent: Jul. 14, 2026

(54) COMPOSITE ELECTRONIC COMPONENT DEVICE HAVING AN INTERPOSER

(71) Applicant: SAMSUNG ELECTRO-MECHANICS CO., LTD., Suwon-si (KR)

(72) Inventors: Jeong Pil Jhun, Suwon-si (KR); Soo Hwan Son, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 112 days.

(21) Appl. No.: 18/519,303

(22) Filed: Nov. 27, 2023

(65) Prior Publication Data

US 2024/0266116 A1     Aug. 8, 2024

(30) Foreign Application Priority Data

Feb. 2, 2023     (KR) ........................ 10-2023-0014098

(51) Int. Cl.
   *H01G 4/30*          (2006.01)
   *H01G 2/06*          (2006.01)
(52) U.S. Cl.
   CPC .............. *H01G 4/30* (2013.01); *H01G 2/065* (2013.01)
(58) Field of Classification Search
   CPC ................................. H01G 2/065; H01G 4/30
   See application file for complete search history.

(56) References Cited

U.S. PATENT DOCUMENTS

| | | | |
|---|---|---|---|
| 2012/0142186 A1 | 6/2012 | Shimoi et al. | |
| 2017/0105283 A1 | 4/2017 | Kim et al. | |
| 2018/0096794 A1 | 4/2018 | Morita et al. | |
| 2019/0326060 A1 * | 10/2019 | Park ........................ | H01G 4/30 |
| 2021/0335544 A1 | 10/2021 | Yokomizo | |
| 2021/0335547 A1 | 10/2021 | Yokomizo | |
| 2021/0337669 A1 | 10/2021 | Yokomizo | |

(Continued)

FOREIGN PATENT DOCUMENTS

| | | |
|---|---|---|
| JP | 5509332 B2 | 6/2014 |
| JP | 2015-023209 A | 2/2015 |
| JP | 2018-060877 A | 4/2018 |

(Continued)

*Primary Examiner* — David M Sinclair
(74) *Attorney, Agent, or Firm* — Morgan, Lewis & Bockius LLP

(57)          ABSTRACT

A composite electronic component according to an example embodiment includes: a multilayer ceramic capacitor including a body including dielectric layers, first and second internal electrodes, and first and second external electrodes, first and second interposer connected to the first and second external electrodes, respectively. The first and second interposer respectively include first and second connection units, first and second mounting units, first and second connection vias penetrating through the first and second connection unit, respectively, and first and second mounting vias penetrating through the first and second mounting units, respectively. The first connection via and the first mounting via are disposed so as not to overlap each other based on the first direction, and the second connection via and the second mounting via are disposed so as not to overlap each other based on the first direction.

20 Claims, 12 Drawing Sheets

(56)      References Cited

U.S. PATENT DOCUMENTS

2021/0337670 A1      10/2021  Yokomizo
2022/0199325 A1*     6/2022  Chikuma  .............. H01G 4/008

FOREIGN PATENT DOCUMENTS

| | | | |
|---|---|---|---|
| JP | 2021-174866 A | 11/2021 | |
| JP | 20211-74864 A | 11/2021 | |
| JP | 20211-74865 A | 11/2021 | |
| JP | 20211-74867 A | 11/2021 | |
| KR | 10-2017-0042958 A | 4/2017 | |
| KR | 10-2019-0045748 A | 5/2019 | |
| WO | WO-2014126084 A1 * | 8/2014 | .............. H01G 4/30 |

* cited by examiner

COMPOSITE ELECTRONIC COMPONENT DEVICE HAVING AN INTERPOSER

CROSS-REFERENCE TO RELATED APPLICATION(S)

This application claims benefit of priority to Korean Patent Application No. 10-2023-0014098 filed on Feb. 2, 2023, in the Korean Intellectual Property Office, the disclosure of which is incorporated herein by reference in its entirety.

TECHNICAL FIELD

The present disclosure relates to a composite electronic component.

A multilayer ceramic capacitor (MLCC), one of the stacking electronic components, is a chip-type condenser that is mounted on the printed circuit boards of various electronic products such as imaging devices including a liquid crystal display (LCD) and a plasma display panel (PDP), computers, smartphones, and mobile phones, and serves to charge or discharge electricity therein or therefrom.

Since the multilayer ceramic capacitor has the advantages of being compact, having high capacity and being easy to install, it may be used as a component of various electronic devices. As various electronic devices such as computers and mobile devices have been miniaturized and have become high-powered, there is an increasing demand for miniaturization and high capacity for multilayer ceramic capacitors.

The multilayer ceramic capacitor may have a structure in which a plurality of dielectric layers and internal electrodes having different polarities between the dielectric layers are alternately stacked. Since the dielectric layer has piezoelectric and electrostrictive properties, when a direct current voltage or an alternating current voltage is applied to the multilayer ceramic capacitor, a piezoelectric phenomenon may occur between the internal electrodes, which may cause vibrations.

These vibrations are transmitted through an external electrode of the multilayer ceramic capacitor to a printed circuit board on which the multilayer ceramic capacitor is mounted, resulting in a vibration sound. The vibration sound may correspond to an audible frequency in the range of 20 to 20,000 Hz that is unpleasant to a person, and this unpleasant vibration sound is referred to as acoustic noise.

As electronic devices have been recently used in environments with high voltages and large variations in those voltages, the acoustic noise appears to be sufficiently recognizable to a user. Accordingly, demand for new products with reduced acoustic noise continues to occur.

In order to reduce acoustic noise, it may be possible to consider arranging an interposer on a side on which the multilayer ceramic capacitor is mounted on the printed circuit board, and also, a via penetrating through an interposer may be installed as one of the methods of physically and/or electrically connecting the multilayer ceramic capacitor and the interposer. However, if the via penetrating through the interposer is filled with a conductive bonding agent for connecting the multilayer ceramic capacitor and the interposer, a conductive mounting agent for connecting the interposer and the printed circuit board cannot fill the via, which may deteriorate mounting stability.

SUMMARY

An aspect of the present disclosure is to provide a composite electronic component having excellent mounting stability.

However, the aspects of the present disclosure are not limited to the above-described contents, and may be more easily understood in the process of describing specific embodiments of the present disclosure.

According to an aspect of the present disclosure, provided is a composite electronic component including: a multilayer ceramic capacitor including a body including a dielectric layer and first and second internal electrodes alternately disposed with the dielectric layer interposed therebetween, and the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively, and connected to the first and second internal electrodes, respectively; a first interposer disposed on the first surface of the body and connected to the first external electrode; and a second interposer disposed on the first surface of the body and connected to the second external electrode. The first interposer includes a first connection unit adjacent to the multilayer ceramic capacitor, a first mounting unit disposed below the first connection unit, a first connection via penetrating through the first connection unit, and a first mounting via penetrating through the first mounting unit. The second interposer includes a second connection unit adjacent to the multilayer ceramic capacitor, a second mounting unit disposed below the second connection unit, a second connection via penetrating through the second connection unit, and a second mounting via penetrating through the second mounting unit. The first connection via and the first mounting via are disposed so as not to overlap each other based on the first direction, and the second connection via and the second mounting via are disposed so as not to overlap each other based on the first direction.

According to another aspect of the present disclosure, provided is a composite electronic component including: a multilayer ceramic capacitor including a body including a dielectric layer and first and second internal electrodes alternately disposed with the dielectric layer interposed therebetween, and the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively; a first interposer disposed on the first surface of the body and connected to the first external electrode through a first conductive bonding agent; and a second interposer disposed on the first surface of the body and connected to the second external electrode through a second conductive bonding agent. The first interposer includes a first connection via disposed at an upper portion of the first interposer adjacent to the multilayer ceramic capacitor and a first mounting via disposed at a lower portion of the first interposer. The second interposer includes a second connection via disposed at an upper portion of the first interposer adjacent to the multilayer ceramic capacitor and a second mounting via disposed at a lower portion of the second interposer. At least a portion of the first connection via is filled with the first conductive bonding agent, but the first mounting via is not filled with the first conductive bonding agent, and at least a portion of the second connection via is filled with the second conductive bonding agent, but the second mounting via is not filled with the second conductive bonding agent.

According to another aspect of the present disclosure, provided is a composite electronic component including: a multilayer ceramic capacitor including a body including a dielectric layer and first and second internal electrodes alternately disposed with the dielectric layer interposed therebetween, and the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively; a first interposer disposed on the first surface of the body and connected to the first external electrode through a first conductive bonding agent; and a second interposer disposed on the first surface of the body and connected to the second external electrode through a second conductive bonding agent. The first interposer includes a first via extending from an upper surface of the first interposer facing the first surface of the body and a second via extending from a lower surface of the first interposer opposing the upper surface of the first interposer. The second interposer includes a third via extending from an upper surface of the second interposer facing the first surface of the body and a fourth via extending from a lower surface of the second interposer opposing the upper surface of the second interposer. At least a portion of the first via is filled with the first conductive bonding agent, such that the first conductive bonding agent is disposed on a level above the lower surface of the first interposer to be closer to the first surface of the body than the lower surface of the first interposer. At least a portion of the third via is filled with the second conductive bonding agent, such that the second conductive bonding agent is disposed on a level above the lower surface of the second interposer to be closer to the first surface of the body than the lower surface of the second interposer.

One of the various effects of the present disclosure is to provide a composite electronic component having excellent mounting stability.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
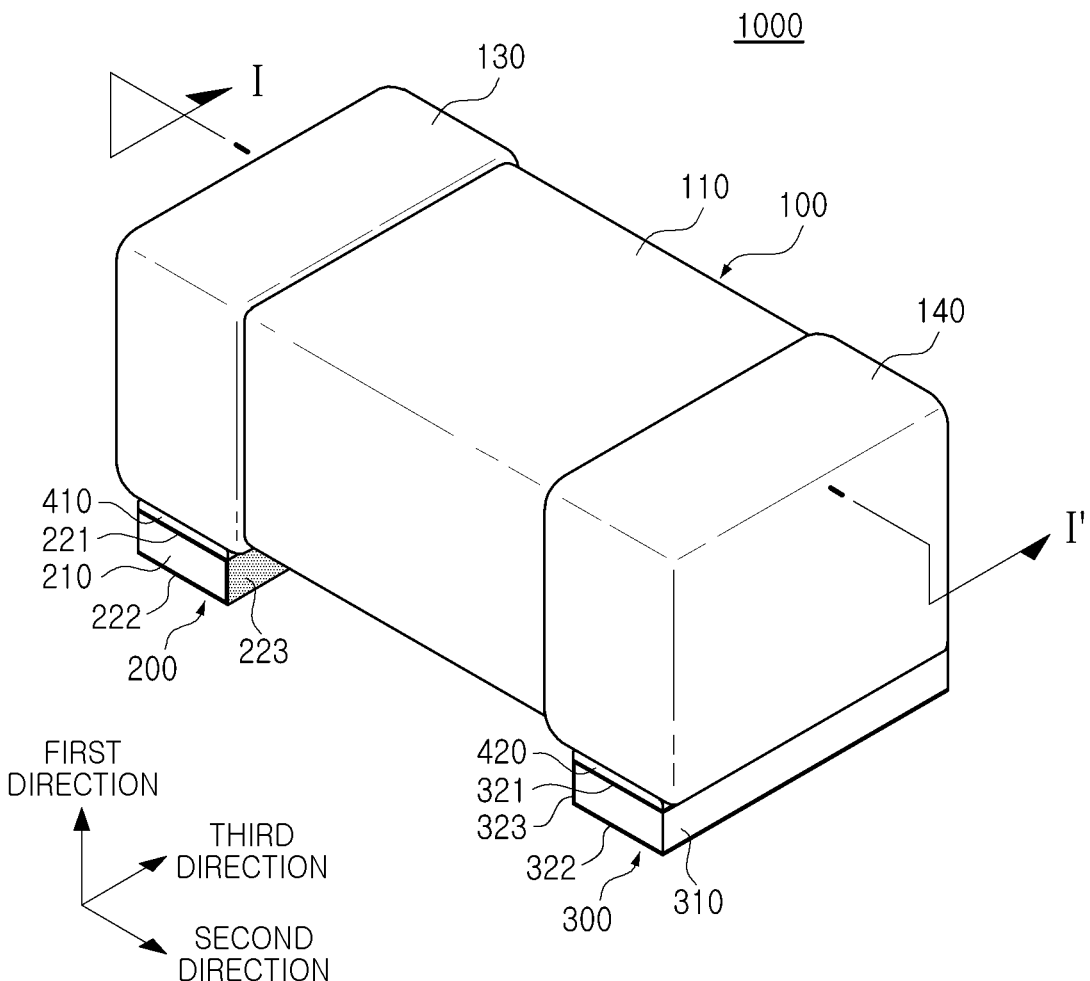
FIG. 1 is a perspective view schematically illustrating a composite electronic component according to a first example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. Furthermore, the example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described the same reference numerals. Throughout the using specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

First Example Embodiment

FIG. 1 is a perspective view schematically illustrating a composite electronic component according to a first example embodiment of the present disclosure.

Figure 2:
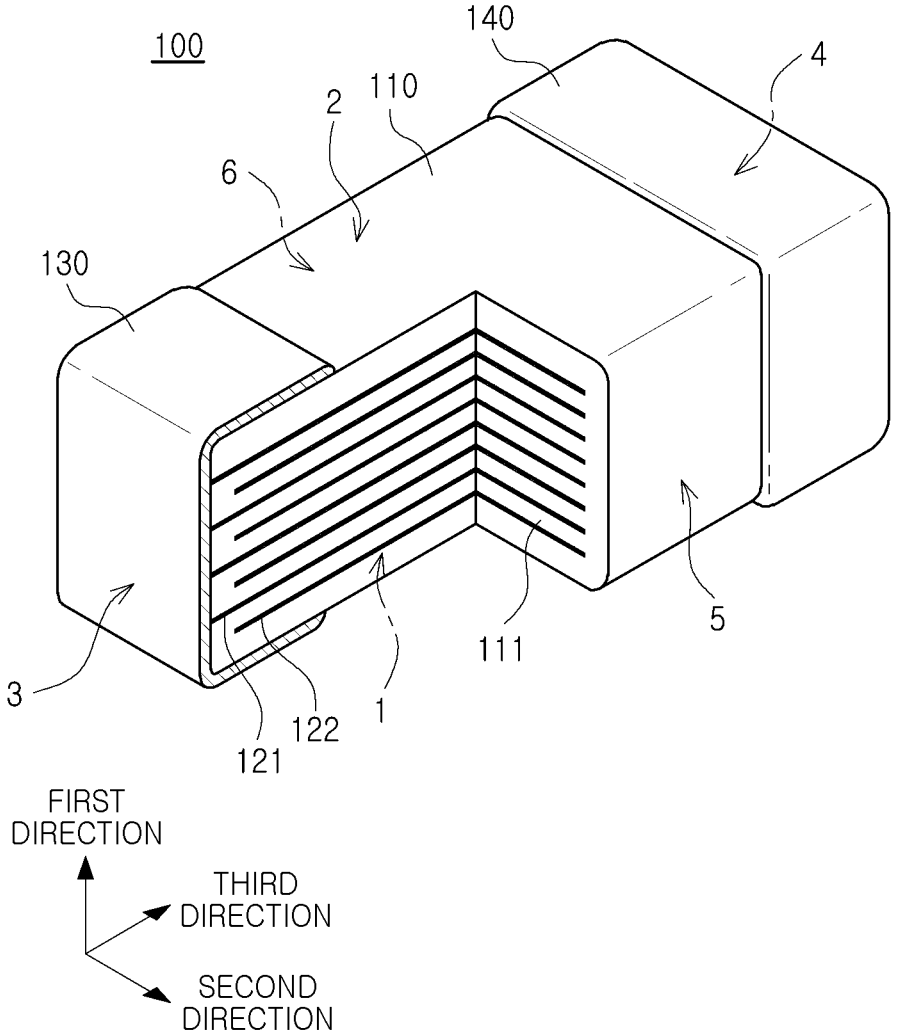
FIG. 2 is a perspective view schematically illustrating a multilayer ceramic capacitor of a composite electronic component according to the first example embodiment of the present disclosure.

FIG. 2 is a perspective view schematically illustrating a multilayer ceramic capacitor of a composite electronic component according to the first example embodiment of the present disclosure.

Figure 3:
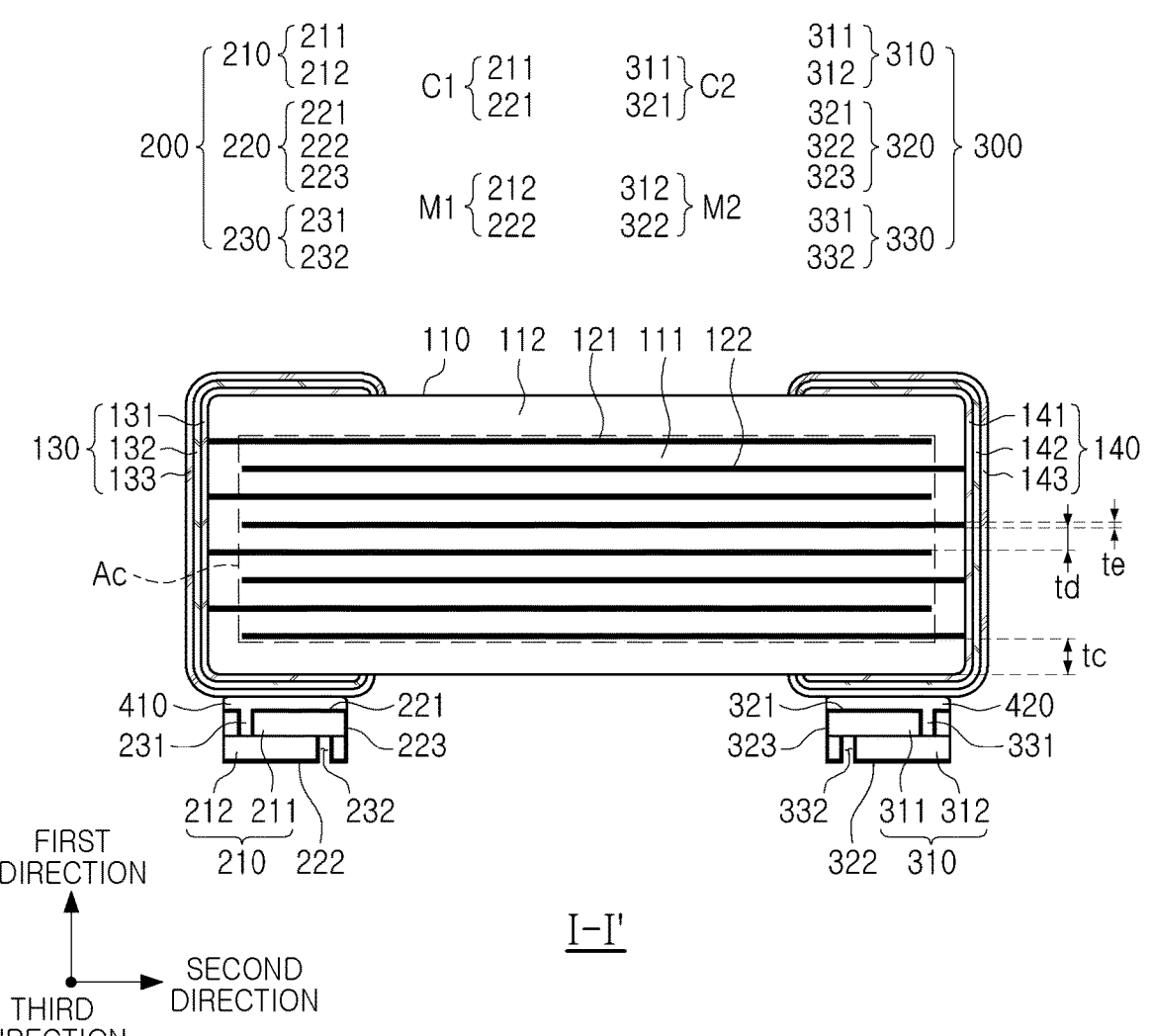
FIG. 3 is a cross-sectional view schematically illustrating cross-section I-I' of FIG. 1.

FIG. 3 is a cross-sectional view schematically illustrating cross-section I-I' of FIG. 1.

Figure 4:
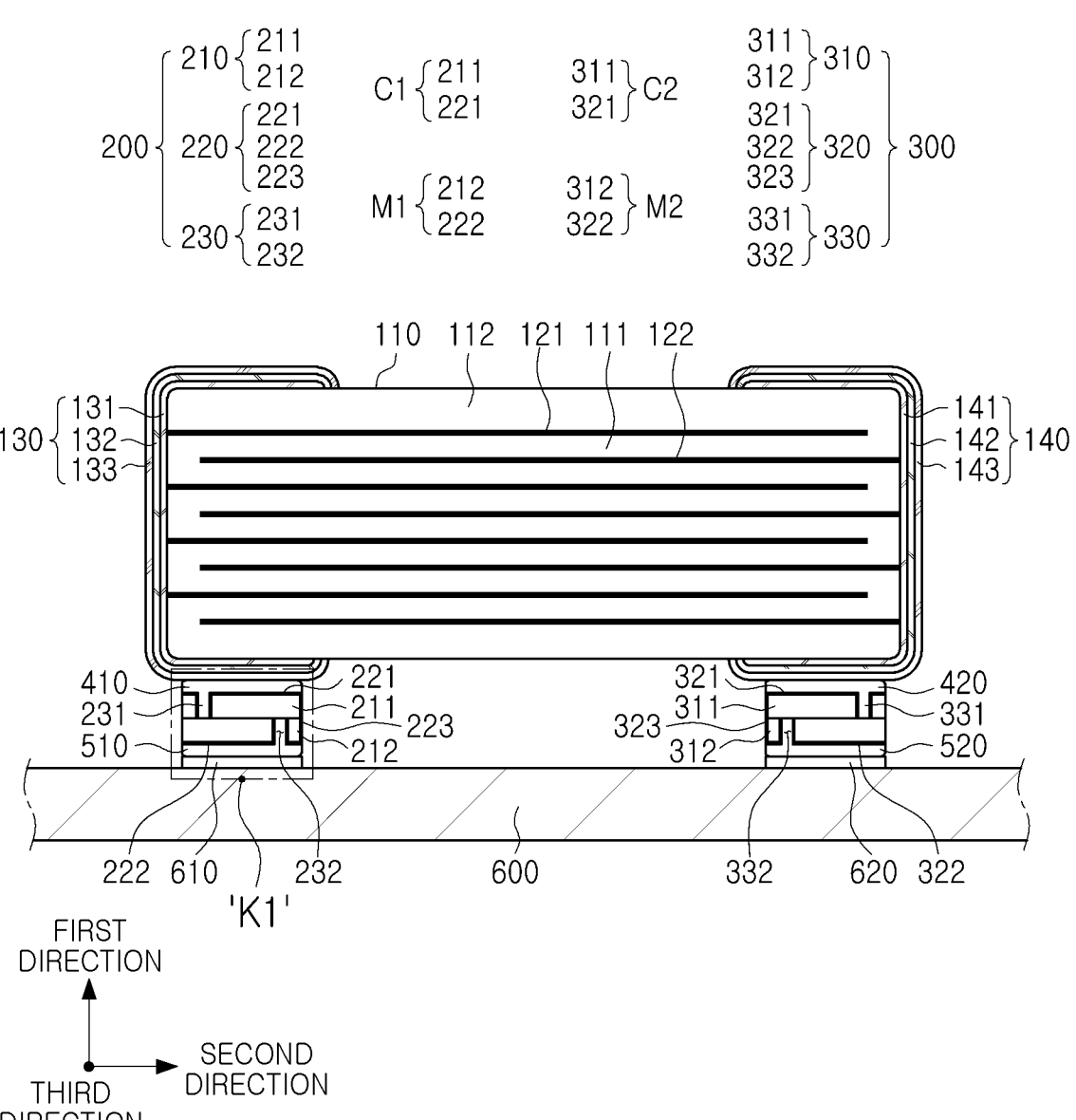
FIG. 4 is a cross-sectional view schematically illustrating a composite electronic component according to a first example embodiment of the present disclosure mounted on a printed circuit board.

FIG. 4 is a cross-sectional view schematically illustrating a composite electronic component according to a first example embodiment of the present disclosure mounted on a printed circuit board.

Figure 5:
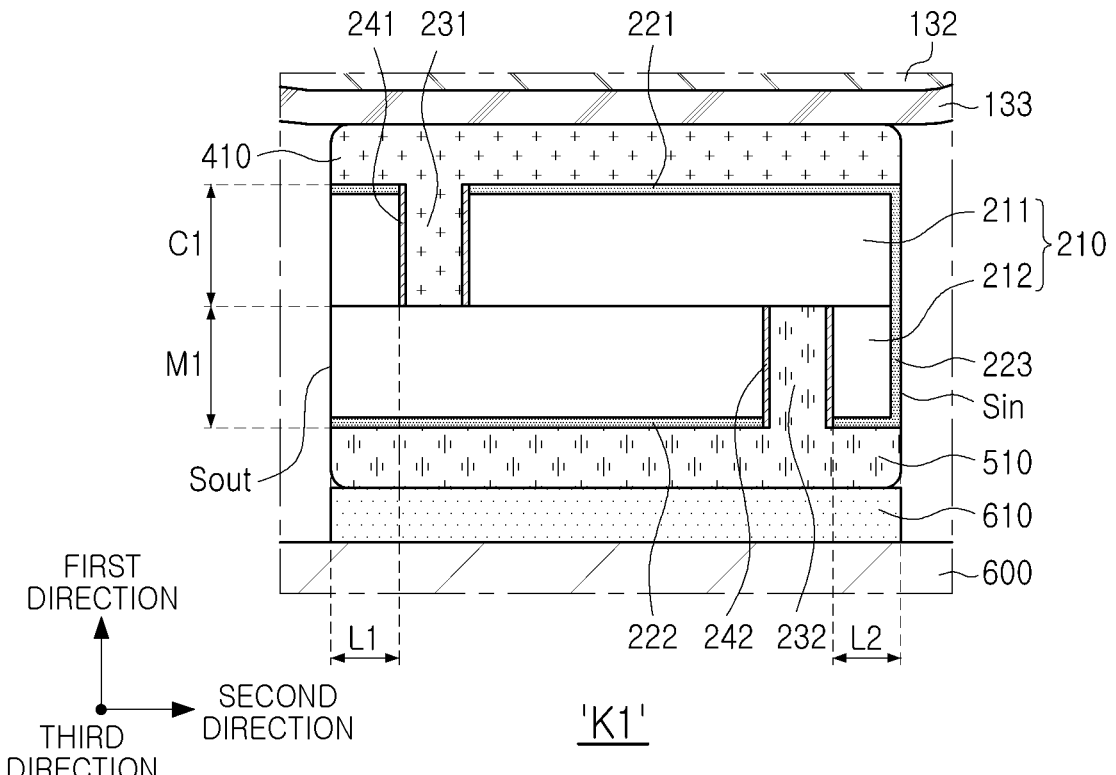
FIG. 5 is an enlarged view of region K1 of FIG. 4.

FIG. 5 is an enlarged view of region K1 of FIG. 4.

Figure 6A:
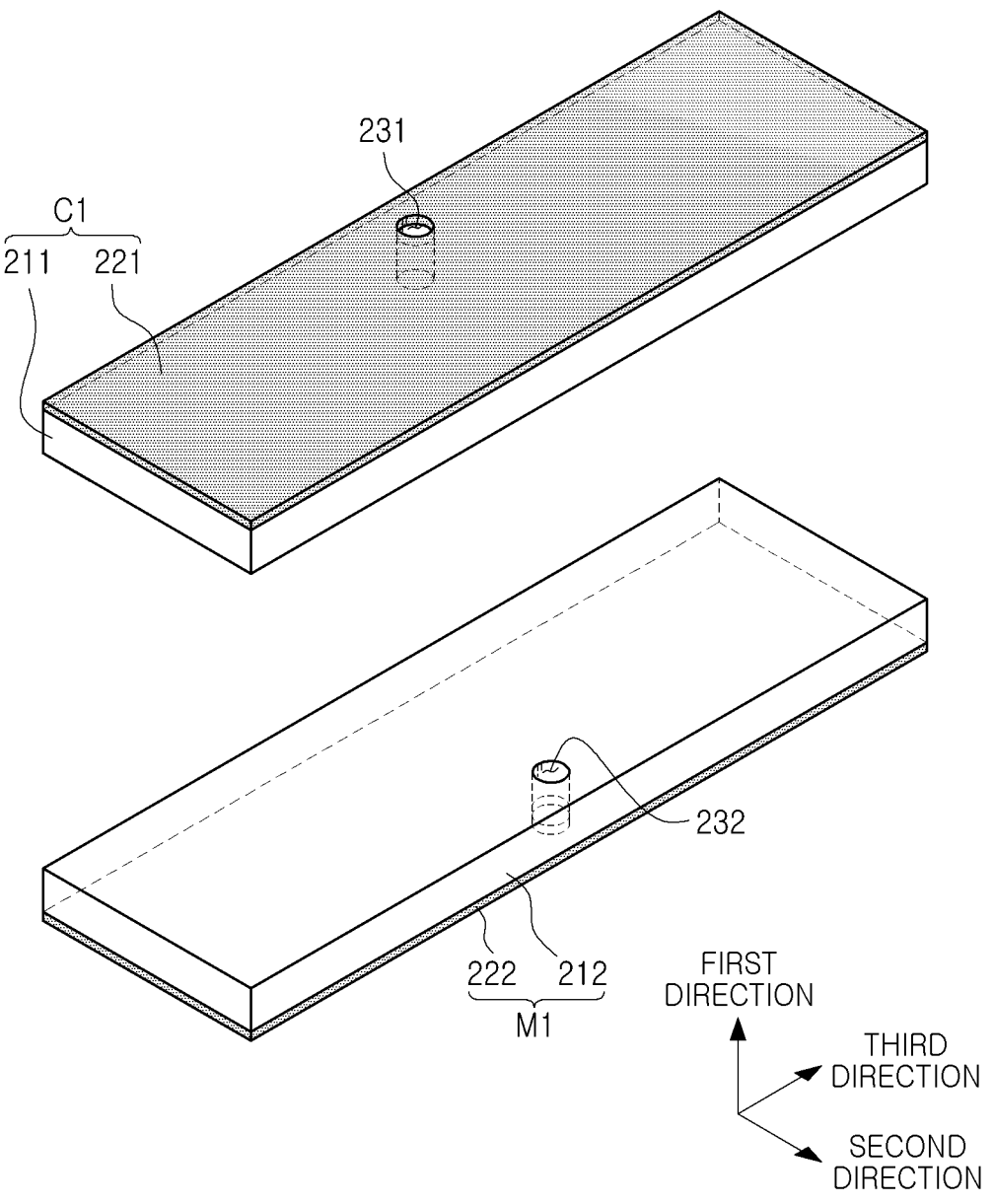
FIGS. 6A and 6B are perspective views schematically illustrating a form in which a connection via and a mounting via of a composite electronic component according to a first example embodiment of the present disclosure are disposed.
Figure 6B:
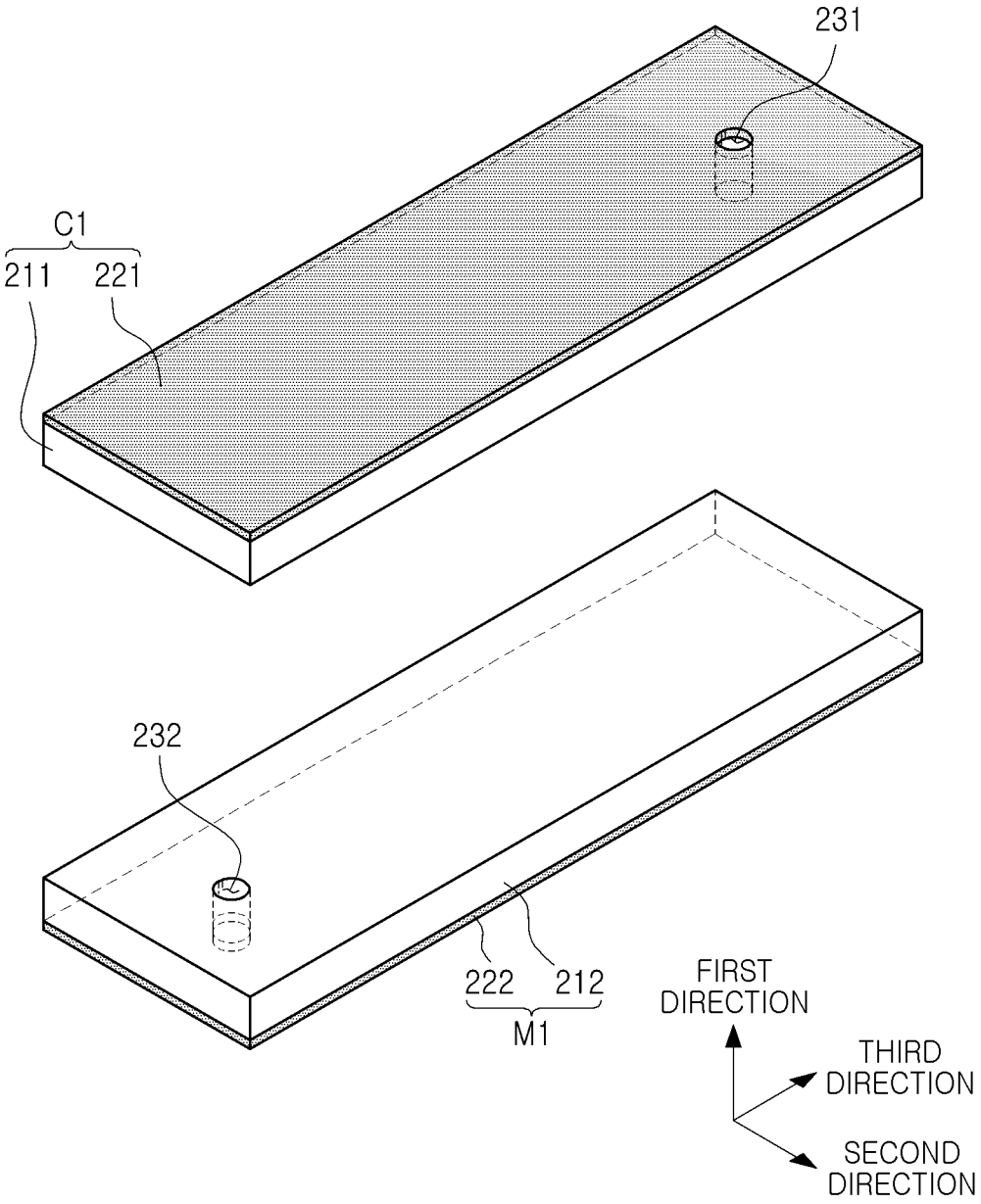

FIGS. 6A and 6B are perspective views schematically illustrating a form in which a connection via and a mounting via of a composite electronic component according to a first example embodiment of the present disclosure are disposed.

Hereinafter, a composite electronic component according to a first example embodiment of the present disclosure will be described with reference to FIGS. 1 to 6B.

A composite electronic component 1000 according to the first example embodiment of the present disclosure may include a multilayer ceramic capacitor 100 and a first interposer 200 and a second interposer 300 connected to the multilayer ceramic capacitor 100.

The multilayer ceramic capacitor 100 may include a body 110 including a dielectric layer 111 and internal electrodes 121 and 122 alternately disposed with the dielectric layer, and external electrodes 130 and 140 disposed outside the body 110 and connected to the internal electrodes 121 and 122.

There is no particular limitation on a specific shape of the body 110, but as illustrated, the body 110 may have a hexahedral shape or a shape similar thereto. Due to the shrinkage of ceramic powder particles included in the body 110 during a sintering process or the polishing of corners after the sintering, the body 110 is not a hexahedral shape with a complete straight line, but may have a substantially hexahedral shape.

The body 110 may have a first surface 1 and a second surface 2 opposing each other in a first direction, a third surface 3 and a fourth surface 4 connected to the first surface 1 and the second surfaced 2 and opposing each other in a second direction, and a fifth surface 5 and a sixth surface 6 connected to the first to fourth surfaces 1, 2, 3 and 4 and opposing each other in a third direction.

In the body 110, a dielectric layer 111 and internal electrodes 121 and 122 may be alternately stacked. Since a plurality of dielectric layers 111 forming the body 110 are in a sintered state, a boundary between adjacent dielectric layers 111 may be integrated to the extent that the boundary may be difficult to confirm without using a scanning electron microscope (SEM).

The dielectric layer 111 may be formed by manufacturing a ceramic slurry including ceramic powder particles, an organic solvent, and a binder, preparing a ceramic green sheet by applying and drying the slurry on a carrier film, and then sintering the ceramic green sheet. The ceramic powder particles are not particularly limited as long as they can obtain sufficient capacitance, but for example, barium titanate-based materials, lead composite perovskite-based materials, or strontium titanate-based materials can be used for the ceramic powder particles, and examples of the ceramic powder particles may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)$ $(Ti_{1-y}Zr_y)O_3$ $(0<x<1, 0<y<1)$ which is formed by partially employing calcium (Ca) and zirconium (Zr) in $BaTiO_3$, or $Ba(Ti_{1-y}Zr_y)$ $O_3$ $(0<y<1)$.

An average thickness td of the dielectric layer 111 is not particularly limited, but may be, for example, 0.5 µm or less. Here, the average thickness td of the dielectric layer 111 refers to a size in the first direction of the dielectric layer 111 disposed between the internal electrodes 121 and 122. The average thickness of the dielectric layer 111 in the first direction may be measured by scanning an image of the first and second directional cross-sections of the body 110 with the scanning electron microscope (SEM) of 10,000× magnification. More specifically, the average value may be measured by measuring the thickness at a plurality of points of one dielectric layer 111, for example, 30 points which are spaced apart from each other at equal intervals in the second direction. The 30 points spaced apart from each other at equal intervals may be designated in a capacitance formation portion Ac to be described below. In addition, when the average value is measured by extending an average value measurement up to 10 dielectric layers 111, the average thickness of the dielectric layer 111 may be further generalized.

The internal electrodes 121 and d 122 may be alternately disposed with the dielectric layer 111, and for example, a pair of electrodes with different polarities, i.e., the first internal electrode 121 and the second internal electrode 122, may be disposed to oppose each other with the dielectric layer 111 interposed therebetween. The first internal electrode 121 and the second internal electrode 122 may be electrically separated from each other by the dielectric layer 111 disposed therebetween. The first internal electrode 121 may be spaced apart from the fourth surface 4 and may be connected to the third surface 3. In addition, the second internal electrode 122 may be spaced apart from the third surface 3 and may be connected to the fourth surface 4.

As illustrated in FIG. 2, the first internal electrode 121 and the second internal electrode 122 may be alternately disposed in the first direction with the dielectric layer 111 interposed therebetween, but the present disclosure is not limited thereto, and the first internal electrode 121 and the second internal electrode 122 may be alternately disposed in the third direction with the dielectric layer 111 interposed therebetween.

Conductive metals included in the internal electrodes 121 and 122 may be one or more of nickel (Ni), copper (Cu), palladium (Pd), silver (Ag), gold (Au), platinum (Pt), tin (Sn), and tungsten (W), titanium (Ti), and alloys thereof, but the present disclosure is not limited thereto.

The internal electrodes 121 and 122 may be formed by applying a conductive paste for internal electrodes including a conductive metal by a predetermined thickness on a ceramic green sheet and sintering the conductive paste. A printing method for the conductive paste for internal electrodes may be a screen printing method or a gravure printing method, but the present disclosure is not limited thereto.

An average thickness te of the internal electrodes 121 and 122 does not need to be particularly limited, but may be, for example, 0.5 µm or more and 2.0 µm or less. The average thickness te of the internal electrodes 121 and 122 denotes a size of the internal electrodes 121 and 122 in the first direction. Here, the average thickness of the internal electrodes 121 and 122 may be measured by scanning an image of the first and second directional cross sections of the body 110 with a scanning electron microscope (SEM) at 10,000× magnification. More specifically, the average value may be measured by measuring the thickness at a plurality of points of one internal electrode 121 or 122, for example, 30 points which are spaced apart from each other at equal intervals in the second direction. The 30 points spaced apart from each other at equal intervals may be designated in a capacitance formation portion Ac to describe below. In addition, when the average value is measured by extending an average value measurement up to 10 internal electrodes 121 or 122, the average thickness of the internal electrodes 121 or 122 may be further generalized.

The body 110 may include a capacitance formation portion Ac disposed inside the body 110 and having capacitance formed by including first and second internal electrodes 121 and 122 alternately disposed with the dielectric layer 111 interposed therebetween, and a first cover portion 112 and a second cover portion 113 respectively disposed on both surfaces of the capacitance formation portion Ac opposing each other in the first direction. The cover portions 112 and 113 may basically serve to prevent damage to the internal electrodes due to physical or chemical stress. The cover portions 112 and 113 may have the same configuration as the dielectric layer 111 except that they do not include the internal electrodes.

An average thickness tc of the cover portions 112 and 113 does not need to be particularly limited, but may be, for example, 20 μm or less, more preferably 10 μm or less. Here, the average thickness of the cover portions 112 and 113 denotes an average thickness of each of the first cover portion 112 and the second cover portion 113. The average thickness tc of the cover portions 112 and 113 may denotes an average size of the cover portions 112 and 113 in the first direction, and may be a value obtained by averaging first directional sizes measured at five points spaced apart from each other at equal intervals in the cross-sections of the body 110 in the first direction and the second direction.

The external electrodes 130 and 140 may be disposed on the third surface 3 and the fourth surface 4 of the body 110, and may extend onto portions of the first, second, fifth and sixth surfaces. Furthermore, the external electrodes 130 and 140 may include a first external electrode 130 disposed on the third surface 3 and connected to the first internal electrode 121, and a second external electrode 140 disposed on the fourth surface 4 and connected to the second internal electrode 122.

Furthermore, as illustrated in FIG. 3, the external electrodes 130 and 140 include basic electrode layers 131 and 141 connected to the internal electrodes 121 and 122, intermediate electrode layers 132 and 142 disposed on the basic electrode layers, and terminal electrode layers 133 and 143 disposed on the intermediate electrode layer.

The basic electrode layers 131 and 141 may include a conductive metal and glass. The glass included in the basic electrode layers 131 and 141 may serve to improve bonding force between the external electrodes 130 and 140 and the body 110. The basic electrode layers 131 and 141 may be formed, for example, by dipping the third surface 3 and the fourth surface 4 of the body 110 in a conductive paste including the conductive metal and the glass and then sintering the third surface 3 and the fourth surface 4 of the body 110.

The conductive metal included in the basic electrode layers 131 and 141 may include copper (Cu), nickel (Ni), palladium (Pd), platinum (Pt), gold (Au), silver (Ag), lead (Pb), and/or alloys containing these metals, but the present disclosure is not limited thereto.

The intermediate electrode layers 132 and 142 may include, for example, a conductive metal and a resin. As the conductive metal included in the intermediate electrode layers 132 and 142, a material having excellent electrical conductivity may be used, but the present disclosure is not particularly limited. For example, the conductive metal included in the intermediate electrode layers 132 and 142 may include copper (Cu), nickel (Ni), palladium (Pd), platinum (Pt), gold (Au), silver (Ag), lead (Pb), and/or alloys containing these metals.

A resin included in the intermediate electrode layers 132 and 142 may be a thermosetting resin, and may include, for example, one or more of an epoxy resin, a phenol resin, a urethane resin, a silicone resin, and a polyimide resin, but the present disclosure is not limited thereto. The intermediate electrode layers 132 and 142 may be formed by applying and curing a conductive resin composition including the conductive metal and the resin.

Because the intermediate electrode layers 132 and 142 include a resin, they may have relatively higher flexibility than the basic electrode layers 131 and 141. Accordingly, the intermediate electrode layers 132 and 142 may protect the body 110 of the multilayer ceramic capacitor 100 from external physical shocks or bending shocks, may prevent cracks from occurring in the multilayer ceramic capacitor 100, and may suppress acoustic noise by adsorbing piezoelectric vibration caused by the dielectric layer 111.

The terminal electrode layers 133 and 143 may improve mounting characteristics. The type of the terminal electrode layers 133 and 143 is not particularly limited, and may be a plating layer including nickel (Ni), tin (Sn), palladium (Pd), and/or alloys containing these metals, and may be formed of a plurality of layers. The terminal electrode layers 133 and 143 may be, for example, a nickel (Ni) plating layer or a tin (Sn) plating layer, or may be formed by sequentially forming the nickel (Ni) plating layer and the tin (Sn) plating layer. Furthermore, the terminal electrode layers 133 and 143 may include a plurality of nickel (Ni) plating layers and/or a plurality of tin (Sn) plating layers.

Referring to FIGS. 3 to 5, a composite electronic component 1000 according to a first example embodiment may include interposers 200 and 300 disposed on the first surface 1 of the body 110, and the interposer may include a first interposer 200 connected to the first external electrode 130 and a second interposer 300 connected to the second external electrode 140. The first interposer 200 may be connected to the first external electrode 130 through a first conductive bonding agent 410, and the second interposer 300 may be connected to the second external electrode 140 through a second conductive bonding agent 420.

Referring to FIG. 4, a printed circuit board 600 on which the composite electronic component 1000 according to the first example embodiment is mounted may include a first electrode pad 610 and a second electrode pad 620 on one surface thereof, and the first and second interposers 200 and 300 may be electrically connected to the first and second electrode pads 610 and 620 through a first conductive mounting agent 510 and a second conductive mount agent 520, respectively. The conductive bonding agents 410 and 420 and the conductive mounting agents 510 and 520 may be, for example, solders for bonding, and may include at least one of tin (Sn), antimony (Sb), cadmium (Cd), lead (Pb), zinc (Zn), aluminum (Al), and copper (Cu), but the present disclosure is not limited thereto.

When voltages having different polarities are applied to the first and second external electrodes 130 and 140 in a state in which the composite electronic component 1000 is mounted on the printed circuit board 600, due to a reverse piezoelectric effect of the dielectric layer 111, the body 110 can repeatedly expand and contract to generate vibrations, and such vibrations may be transmitted to the printed circuit board 600, thus causing the acoustic noise.

Meanwhile, in the case of the composite electronic component 1000 according to the first example embodiment, the interposers 200 and 300 may be disposed on the first surface 1 oriented toward a mounting direction of the multilayer ceramic capacitor 100, so that the multilayer ceramic capacitor 100 may be spaced apart from the printed circuit board 600. Accordingly, vibrations transmitted from the multilayer ceramic capacitor 100 to the printed circuit board 600 may be absorbed to reduce the acoustic noise.

The first interposer 200 may include, for example, a first substrate 210, a first electrode 220 disposed outside the first substrate, and a first via 230 penetrating through a portion of the first interposer 200. Furthermore, the second interposer 300 may include, for example, a second substrate 310, a second electrode 320 disposed outside the second substrate, and a second via 330 penetrating through a portion of the second interposer 300.

The first substrate 210 may include a first connection substrate 211 adjacent to the multilayer ceramic capacitor 100 and a first mounting substrate 212 disposed below the first connection substrate 211. The second substrate 310 may include a second connection substrate 311 adjacent to the multilayer ceramic capacitor 100 and a second mounting substrate 312 disposed below the second connection substrate 311. The first and second substrates 210 and 310 may be formed of, for example, ceramic and/or an insulating resin. The ceramic may be, for example, $Al_2O_3$, and the insulating resin may be, for example, an epoxy resin, a phenol resin, and/or a polyimide resin, but the present disclosure is not limited thereto.

The first electrode 220 may include a first connection electrode 221 disposed above the first substrate 210 and connected to the first external electrode 130, and a first mounting electrode 222 disposed below the first substrate 210. The second electrode 320 may include a second connection electrode 321 disposed above the second substrate 310 and connected to the second external electrode 140, and a second mounting electrode 322 disposed below the second substrate 310. The first and second electrodes 220 and 320 may serve to electrically connect the multilayer ceramic capacitor 100 and the printed circuit board 600. The first and second electrodes 220 and 320 may include, for example, copper (Cu), nickel (Ni), palladium (Pd), platinum (Pt), gold (Au), silver (Ag), lead (Pb), and/or alloys containing these metals.

The first via 230 may include a first connection via 231 disposed at an upper portion of the first interposer 200 adjacent to the multilayer ceramic capacitor 100, and a first mounting via 232 disposed at a lower portion of the first interposer 200. The second via 330 may include a second connection via 331 disposed at an upper portion of the second interposer 300 adjacent to the multilayer ceramic capacitor 100, and a second mounting via 332 disposed at a lower portion of the second interposer 300. As will be described later, the first and second vias 230 and 330 may serve to improve the mounting stability of the composite electronic component electrically connect the multilayer ceramic capacitor 100 and the printed circuit board 600.

In this case, when the first interposer 200 is divided into regions according to arranged position, the first interposer 200 may include a first connection unit C1 adjacent to the multilayer ceramic capacitor 100 and a first mounting unit M1 disposed below the first connection unit C1. The first connection unit C1 may include a first connection substrate 211 and a first connection electrode 221 disposed above the first connection substrate 211 and connected to the first external electrode 130, and the first mounting unit M1 may include a first mounting substrate 212 and a first mounting electrode 222 disposed below the first mounting substrate 212.

Furthermore, when the second interposer 300 is divided into regions according to arranged position, the second interposer 300 may include a second connection unit C2 adjacent to the multilayer ceramic capacitor 100 and a second mounting unit M2 disposed below the second connection unit C2. The second connection unit C2 may include a second connection substrate 311 and a second connection electrode 321 disposed above the second connection substrate 311 and connected to the second external electrode 140, and the second mounting unit M2 may include a second mounting substrate 312 and a second mounting electrode 322 disposed below the second mounting substrate 312.

According to the first example embodiment of the present disclosure, the first connection via 231 may penetrate through the first connection unit C1 in the first direction, and the first mounting via 232 may penetrate through the first mounting unit M1 in the first direction. Furthermore, the second connection via 331 may penetrate through the second connection unit C2 in the first direction, and the second mounting via 332 may penetrate through the second mounting unit M2 in the first direction. Accordingly, at least a portion of an interior of the first connection via 231 may be filled with the first conductive bonding agent 410, and at least a portion of an interior of the second connection via 331 may be filled with the second conductive bonding agent 420. As a result, bonding force between the multilayer ceramic capacitor 100 and the interposers 200 and 300 may be improved.

Meanwhile, the first connection via 231 and the first mounting via 232 may be disposed so as not to overlap each other in the first direction, and the second connection via 331 and the second mounting via 332 may be disposed so as not to overlap each other in the first direction. Accordingly, the first mounting via 232 may not be filled with the first conductive bonding agent 410, and the second mounting via 332 may not be filled with the second conductive bonding agent 420. That is, by preventing the conductive bonding agents 410 and 420 from flowing into the mounting vias 232 and 332, it may be possible to secure a space which the conductive mounting agents 510 and 520 may fill inside the mounting vias 232 and 332, which may improve the bonding force between the interposers 200 and 300 and the electrode pads 610 and 620 of the printed circuit board 600 and secure mounting stability of the composite electronic component 1000.

In this case, the first connection via 231 may not penetrate through the first mounting unit M1, and the first mounting via 232 may not penetrate through the first connection unit C1. Additionally, the second connection via 331 may not penetrate through the second mounting unit M2, and the second mounting via 332 may not penetrate through the second connection unit C2. This may prevent the connection vias 231 and 331 and the mounting vias 232 and 332 from being filled with the conductive bonding agents 410 and 420, and an interior of the mounting vias 232 and 332 may be filled with only the conductive mounting agents 510 and 520, thereby improving the mounting stability of the composite electronic component 1000.

Referring to FIGS. 5 and 6A, in an example embodiment, the first connection via 231 and the first mounting via 232 may be disposed in different positions in the second direction, and the second connection via 331 and the second mounting vias 332 may be disposed in different positions in the second direction. Accordingly, the first connection via 231 and the first mounting via 232 may be disposed so as not to overlap each other in the first direction, and the second connection via 331 and the second mounting via 332 may be disposed so as not to overlap each other in the first direction, and accordingly, it may be possible to prevent the conductive bonding agents 410 and 420 from flowing into the mounting vias 232 and 332.

However, the present disclosure is not limited thereto. For example, as illustrated in FIG. 6B, in an example embodiment, the first connection via 231 and the first mounting via 232 may be disposed in different positions in the third direction. Meanwhile, although not illustrated, the first interposer 200 and the second interposer 300 may be in a symmetrical relationship with each other in the second direction, and accordingly, the second connection via 331 and the second mounting via 332 may likewise be disposed in different positions in the third direction.

In an example embodiment, a via electrode may be disposed on an internal wall of one or more of the first connection via 231, the first mounting via 232, the second connection via 331, and the second mounting via 332. For example, as illustrated in FIG. 5, a first connection via electrode 241 may be disposed on an internal wall of the first connection via 231, and a first mounting via electrode 242 may be disposed on an inner wall of the first mounting via 232. Accordingly, the first conductive bonding agent 410 may sufficiently flow into the first connection via 231 through the first connection via electrode 241, and the first conductive mounting agent 510 may sufficiently flow into the first mounting via 232 through the first mounting via electrode 242, thereby improving the bonding force between the multilayer ceramic capacitor 100 and the interposers 200 and 300 and the bonding force between the interposers 200 and 300 and the electrode pads 610 and 620.

Referring to FIGS. 3 to 5, in an example embodiment, the first interposer 200 may include a first linking electrode 233 disposed on one side surface of the first interposer and connecting the first connection electrode 221 and the first mounting electrode 222, and the second interposer 300 may include a second linking electrode 323 disposed on one side surface of the second interposer and connecting the second connection electrode 321 and the second mounting electrode 322. Accordingly, the first electrode 220 may include the first connection electrode 221, the first mounting electrode 222, and the first linking electrode 223, and the second electrode 320 may include the second connection electrode 321, the second mounting electrode 322, and the second linking electrode 323. The linking electrodes 223 and 323 may connect the connection electrodes 221 and 321 connected to the multilayer ceramic capacitor 100 and the mounting electrodes 222 and 322 connected to the printed circuit board 600, thereby forming a path through which electricity flows between the multilayer ceramic capacitor 100 and the printed circuit board 600.

Figure 7A:
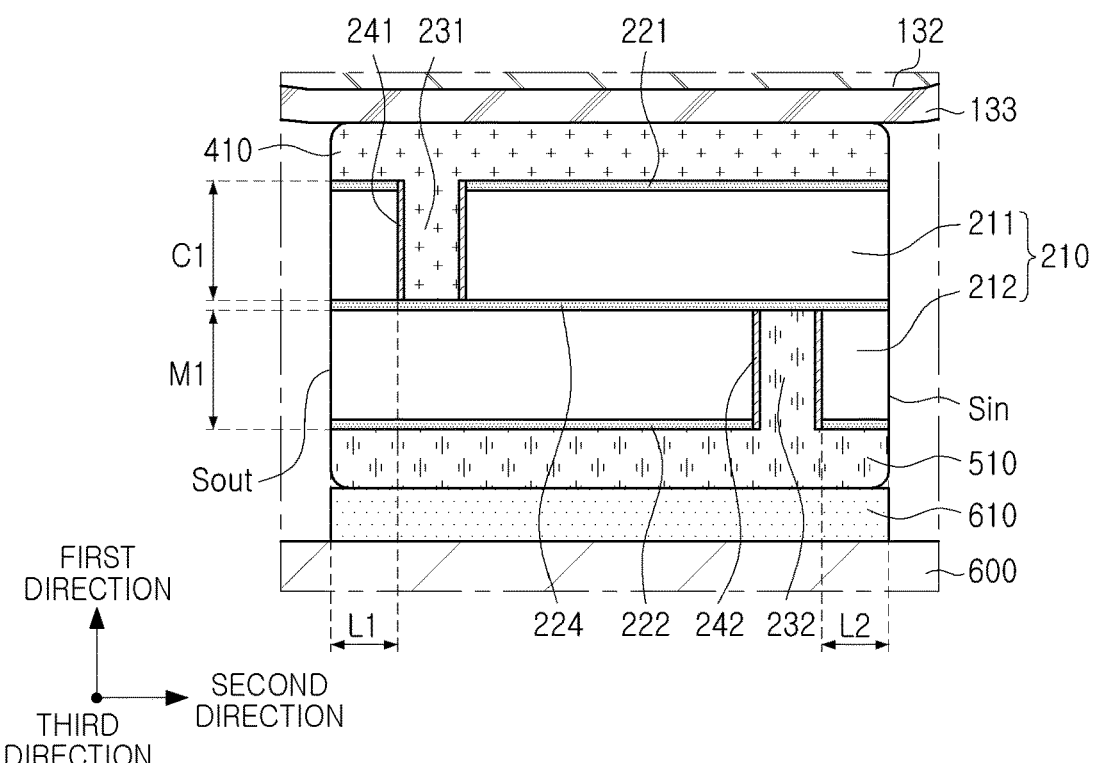
FIG. 7A is a partially enlarged view schematically illustrating a side of a first interposer of a composite electronic component according to a modified form of the first example embodiment mounted on a printed circuit board and FIG. 7B is a partially enlarged view schematically illustrating a side of a second interposer of a composite electronic component according to a modified form of the first example embodiment mounted on a printed circuit board.
Figure 7B:
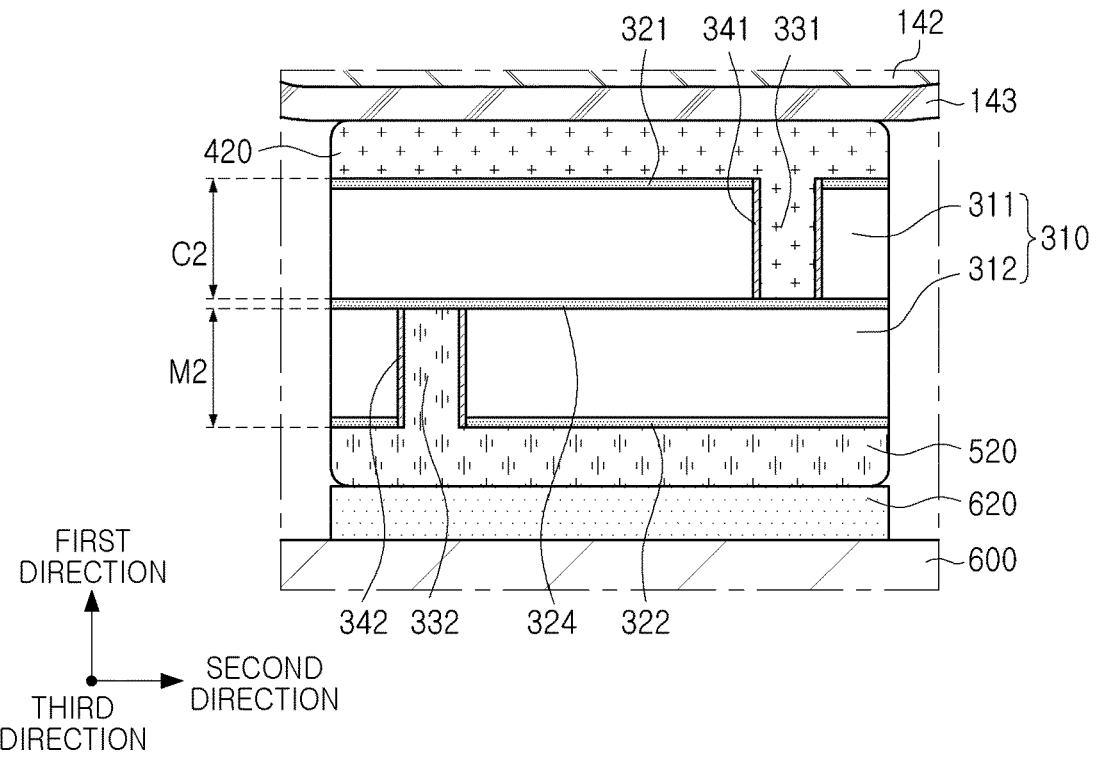

FIG. 7A is a partially enlarged view schematically illustrating a side of a first interposer of a composite electronic component according to a modified form of the first example embodiment mounted on a printed circuit board and FIG. 7B is a partially enlarged view schematically illustrating a side of a second interposer of a composite electronic component according to a modified form of the first example embodiment mounted on a printed circuit board. Referring to FIGS. 7A and 7B, in an example embodiment, a first interposer 200 includes a first intermediate electrode 224 disposed between a first connection unit C1 and a first mounting unit M1, and a second interposer 300 may include a second intermediate electrode 324 disposed between a second connection unit C2 and a second mounting unit M2. That is, the first intermediate electrode 224 may be disposed inside a first substrate 210 and connected to a first connection via 231 and a first mounting via 232, and the second intermediate electrode 324 may be disposed inside a second substrate 310 and connected to a second connection via 331 and a second mounting via 332.

In this case, the first conductive bonding agent 410 may fill a space defined by an internal wall of the first connection via 231 and the first intermediate electrode 224, and the second conductive bonding agent 420 may fill a space defined by an internal wall of the second connection via 232 and the second intermediate electrode 324. This may ensure bonding force between the multilayer ceramic capacitor 100 and the interposers 200 and 300 and simultaneously reducing a distance through which electricity flows from external electrodes 130 and 140 to electrode pads 610 and 620 of a printed circuit board 600, thereby further reducing ESL.

Furthermore, when the interposers 200 and 300 include intermediate electrodes 224 and 324, even if the first connection via 231 and the first mounting via 232 overlap each other in the first direction, or the second connection via 331 and the second mounting via 332 overlap each other in the first direction, the intermediate electrodes 224 and 324 may physically separate the connection vias 231 and 331 from the mounting vias 232 and 332, the conductive bonding agents 410 and 420 may be prevented from flowing into the mounting vias 232 and 332. Accordingly, a space in which the conductive mounting agents 510 and 520 fill inside the mounting vias 232 and 332 may be secured, thereby ensuring the stability of mounting the composite electronic component 1000.

In FIGS. 7A and 7B, the interposers 200 and 300 of the composite electronic component according to the modified form of the first example embodiment are illustrated as not including the linking electrodes 223 and 323, but the present disclosure is not limited thereto, and the interposers 200 and 300 may include both linking electrodes 223 and 323 and the intermediate electrodes 224 and 324.

Referring to FIG. 5, in an example embodiment, a first interposer 200 may include an internal surface Sin and an external surface Sout opposing each other in the second direction, and in the first and second directional cross-sections of the first interposer 200, the first connection via 231 may be disposed to be biased toward the external surface Sout based on the center of the first connection unit C1 in the second direction, and the first mounting via 232 may be disposed to be biased toward the internal surface Sin based on the center of the first mounting unit M1 in the second direction. Accordingly, the first connection via 231 filled with the first conductive bonding agent 410 and the first mounting via 232 filled with the first conductive mounting agent 510 may distribute internal stress, thereby more effectively fixing the composite electronic component 1000 mounted on the printed circuit board 600.

Furthermore, referring to FIGS. 7A and 7B, when the composite electronic component 1000 includes the intermediate electrodes 224 and 324, the first connection via 231 may be disposed to be biased toward the external surface Sout based on the center of the first connection unit C1 in the second direction, so that ESL may be further reduced by reducing the distance through which electricity flows from the external electrodes 130 and 140 to the electrode pads 610 and 620 of the printed circuit board 600.

In this case, a distance L1 in the second direction from the external surface to the internal wall of the first connection via 231 is not particularly limited, but may be within about 0.15 mm, and a distance L2 in the second direction from the internal surface to the internal wall of the first mounting via 232 is not particularly limited, but may be within about 0.15 mm. In this case, an effect of improving mounting stability of the composite electronic component 1000 and reducing the ESL may be more remarkable.

Second Example Embodiment

Next, a composite electronic component 1000 according to the second example embodiment of the present disclosure will be described. Hereinafter, among the configurations of the composite electronic component according to the second example embodiment, configurations similar to those of the first example embodiment will be given the same reference numerals, and descriptions overlapping with the above-described first example embodiment of the present disclosure will be omitted.

Figure 8A:
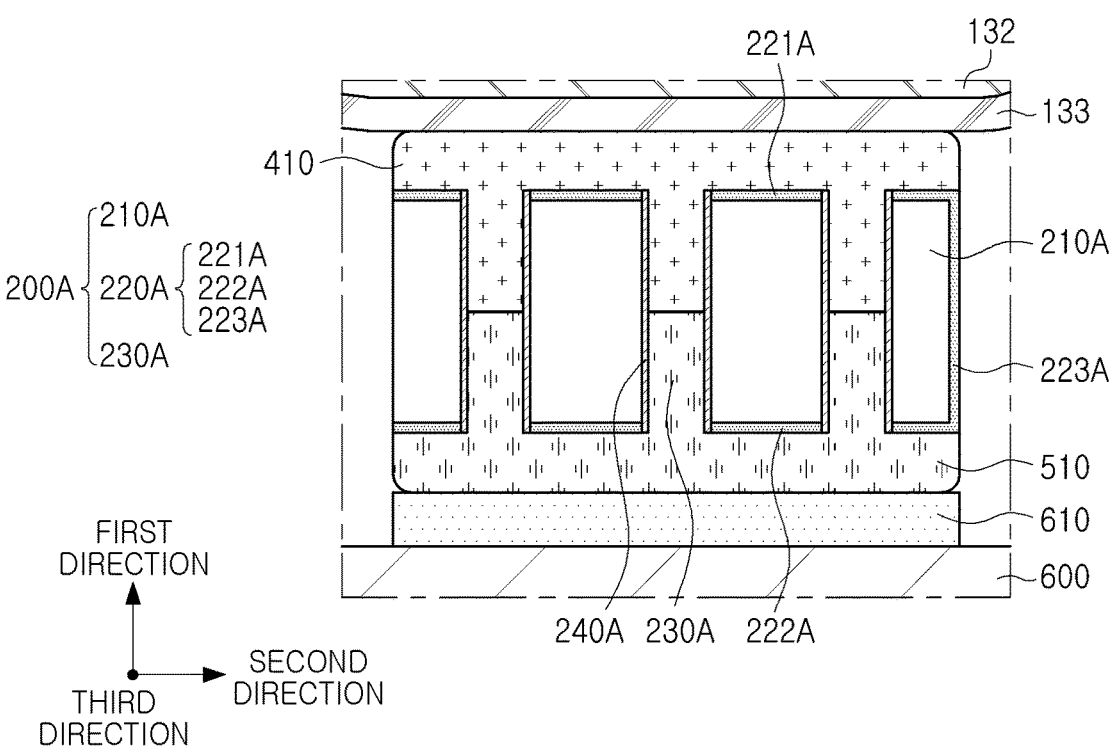
FIG. 8A is a partially enlarged view schematically illustrating a side of a first interposer of a composite electronic component according to a second example embodiment of the present disclosure mounted on a printed circuit board.
Figure 8B:
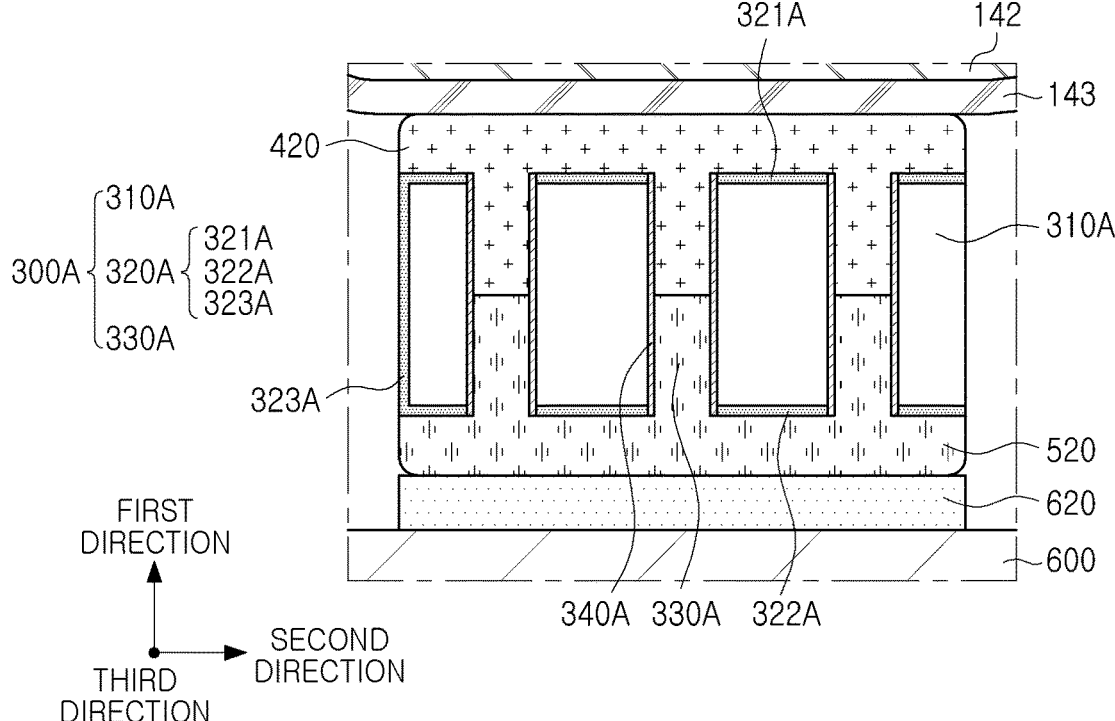
FIG. 8B is a partially enlarged view schematically illustrating a side of a second interposer of a composite electronic component according to a second example embodiment of the present disclosure mounted on a printed circuit board.

FIG. 8A is a partially enlarged view schematically illustrating a side of a first interposer of a composite electronic component according to a second example embodiment of the present disclosure mounted on a printed circuit board, and FIG. 8B is a partially enlarged view schematically illustrating a side of a second interposer of a composite electronic component according to a second example embodiment of the present disclosure mounted on a printed circuit board.

Referring to FIGS. 8A and 8B, a first interposer 200A may include, for example, a first substrate 210A, a first electrode 220A including a first connection electrode 221A, a first mounting electrode 222A and a first linking electrode 223A, and a first via 230A. Furthermore, a second interposer 300A may include, for example, a second substrate 310A, a second electrode 320A including a second connection electrode 321A, a second mounting electrode 322A and a second linking electrode 323A, and a second via 330A.

Furthermore, a first via electrode 240A may be disposed on an internal wall of the first via 230A, and a second via electrode 340A may be disposed on an internal wall of the second via 330A. Conductive bonding agents 410 and 420 and conductive mounting agents 510 and 520 may flow into the vias 320A and 330A through the via electrodes 240A and 340A. As a result, bonding force between the multilayer ceramic capacitor and the interposers 200A and 300A may be secured.

Meanwhile, the first interposer 200A may include a plurality of first vias 230A, and the second interposer 300A may include a plurality of second vias 330A. According to the second example embodiment of the present disclosure, the interposers 200A and 300A may include the plurality of vias 230A and 330A to provide a sufficient space into which the conductive bonding agents 410 and 420 and the conductive mounting agents 510 and 520 may flow. This may prevent the conductive bonding agents 410 and 420 for connecting the multilayer ceramic capacitor and the interposers from filling an interior of the vias 230A and 330A completely, and thus a space in which the conductive mounting agents 510 and 520 may fill inside the vias 230A and 330A may be secured, thereby improving mounting stability of the composite electronic component 1000.

The plurality of first vias 230A may be spaced apart from each other, for example, in the second direction, and the plurality of second vias 330A may be spaced apart from each other, for example, in the second direction. Among the plurality of vias, vias 230A and 330A disposed adjacently to external surfaces of the interposers 200A and 300A may serve to reduce ESL by reducing a distance in which electricity flows from the external electrode to electrode pads 610 and 620. Furthermore, among the plurality of vias, vias 230A and 330A disposed adjacently to internal surfaces of the interposers 200A and 300A may be disposed in an area in which piezoelectric vibrations occurs frequently, thereby serving to improve the mounting stability of the composite electronic component.

Third Example Embodiment

Next, a composite electronic component 1000 according to a third example embodiment of the present disclosure will be described. Hereinafter, among the configurations of the composite electronic component according to the third example embodiment, configurations similar to those of the first example embodiment will be given the same reference numerals, and descriptions overlapping with the above-described first example embodiment of the present disclosure will be omitted.

Figure 9A:
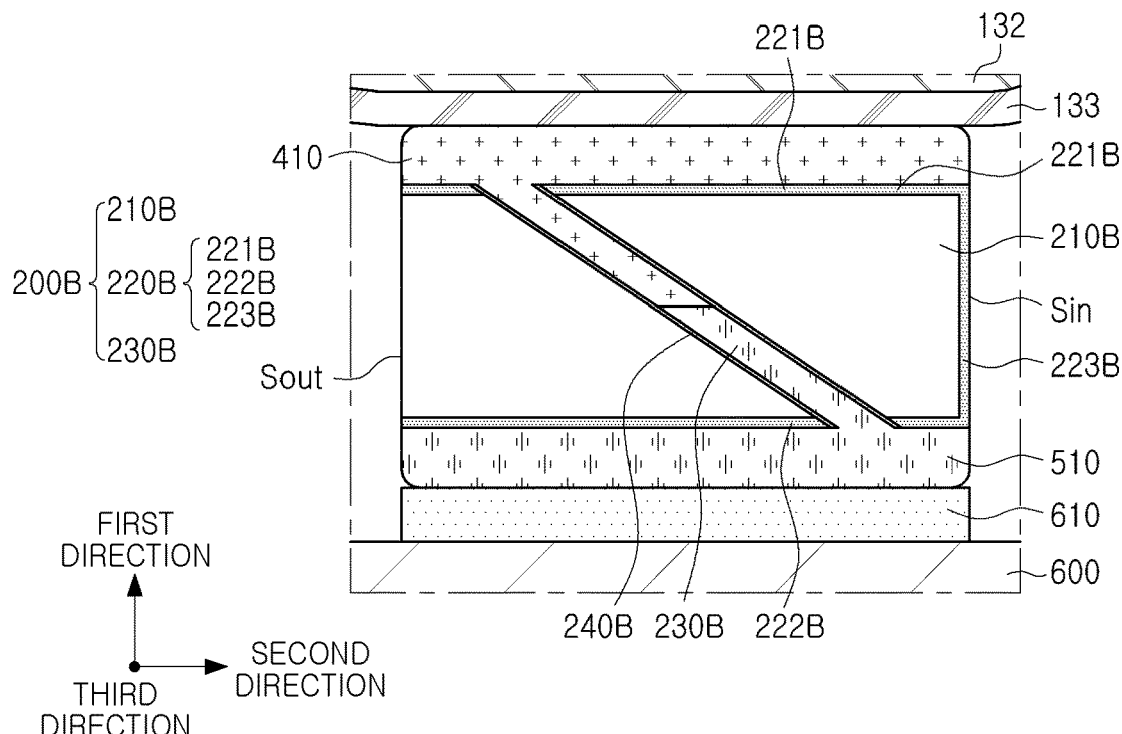
FIG. 9A is a partially enlarged view schematically illustrating a side of a first interposer of a composite electronic component according to a third example embodiment of the present disclosure mounted on a printed circuit board.
Figure 9B:
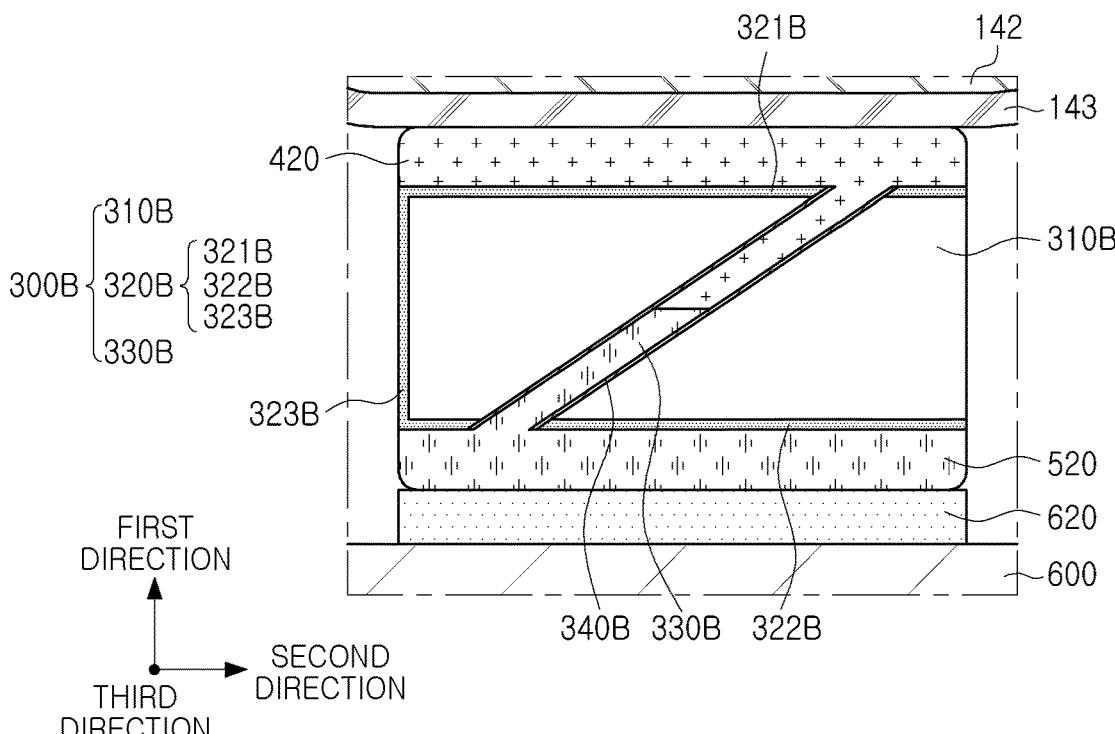
FIG. 9B is a partially enlarged view schematically illustrating a side of a second interposer of a composite electronic component according to a third example embodiment of the present disclosure mounted on a printed circuit board.

FIG. 9A is a partially enlarged view schematically illustrating a side of a first interposer of a composite electronic component according to a third example embodiment of the present disclosure mounted on a printed circuit board, and FIG. 9B is a partially enlarged view schematically illustrating a side of a second interposer of a composite electronic component according to a third example embodiment of the present disclosure mounted on a printed circuit board.

Referring to FIGS. 9A and 9B, a first interposer 200B may include, for example, a first substrate 210B, a first electrode 220B including a first connection electrode 221B, a first mounting electrode 222B and a first linking electrode 223B, and a first via 230B. Furthermore, a second interposer 300B may include, for example, a second substrate 310B, a second electrode 320B including a second connection electrode 321B, a second mounting electrode 322B and a second linking electrode 323B, and a second via 330B.

Furthermore, a first via electrode 240B may be disposed on an internal wall of the first via 230B, and a second via electrode 340B may be disposed on an internal wall of the second via 330B. Conductive bonding agents 410 and 420 and conductive mounting agents 510 and 520 may flow into the vias 230B and 330B through the via electrodes 240B and 340B. Accordingly, bonding force between the multilayer ceramic capacitor and the interposers 200B and 300B may be secured.

According to the third example embodiment of the present disclosure, each of the first via 230B penetrating through the first interposer 200B in the first direction and the second via 330B penetrating through the second interposer 300B in the first direction may be inclined with respect to the first direction. When the vias 230B and 330B have a pillar shape inclined with respect to the first direction, a ratio of surface area to volume may increase as compared to a via in a general pillar shape. Accordingly, a distance by which the conductive bonding agents 410 and 420 need to move to fill the vias 230B and 330B may be increased to prevent the vias 230B and 330B from being fully filled with the conductive bonding agents 410 and 420. Accordingly, a space that the conductive mounting agents 510 and 520 may fill inside the vias 230B and 330B may be secured, thereby improving the mounting stability of the composite electronic component 1000.

A shape in which the vias 230B and 330B are disposed is not particularly limited. Directions in which the first via 230B and the second via 330B are inclined may be symmetrical to each other in the second direction, but the present disclosure is not limited thereto, and the first via 230B and the second via 330B may be inclined in the same direction.

In an example embodiment, an area in which the first via 230B penetrates through the first connection electrode 221B may be disposed adjacently to an external surface Sout of the first interposer 200B, and a region in which the first via 230B penetrates through the first mounting electrode 222B may be disposed adjacently to an internal surface Sin of the first interposer 200B. Furthermore, a region in which the second via 330B penetrates through the second connection electrode 321B may be disposed adjacently to an external surface of the second interposer 300B, and a region in which the second via 330B penetrates through the second mounting electrode 322B may be disposed adjacently to an internal surface of the second interposer 300B.

The regions in which the vias 230B and 330B penetrate through the connection electrodes 221B and 321B may be disposed adjacently to the external surfaces of the interposer 200B and 300B, so that ESL may be reduced by reducing a distance in which electricity flows from the external electrode to the electrode pads 610 and 620. Furthermore, the regions in which the vias 230B and 330B penetrate through the mounting electrodes 222B and 322B may effectively distribute piezoelectric vibrations and may be disposed adjacently to the internal surfaces of the interposers 200B and 300B, thereby serving to improve the mounting stability of the composite electronic component.

Fourth Example Embodiment

Next, a composite electronic component 1000 according to a fourth example embodiment of the present disclosure will be described. Hereinafter, among the configurations of the composite electronic component according to the third example embodiment, configurations similar to those of the first example embodiment will be given the same reference numerals, and descriptions overlapping with the above-described first example embodiment of the present disclosure will be omitted.

Figure 10A:
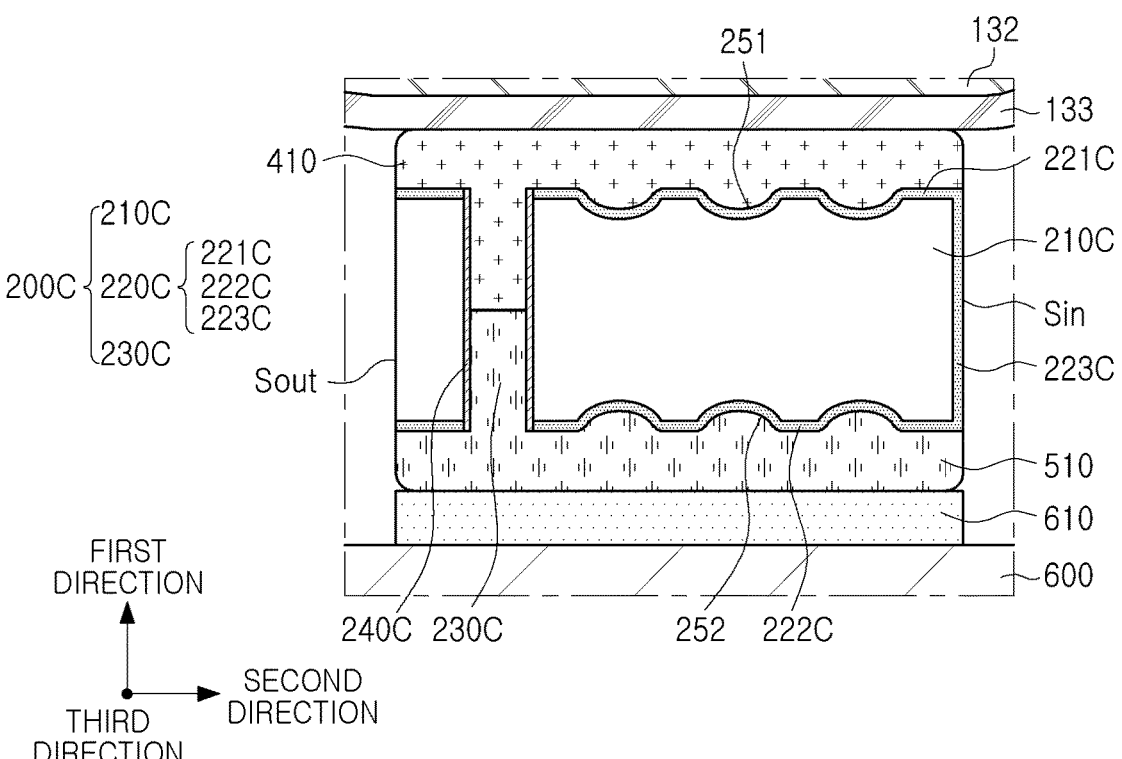
FIG. 10A is a partially enlarged view schematically illustrating a side of a first interposer of a composite electronic component according to a fourth example embodiment of the present disclosure mounted on a printed circuit board.
Figure 10B:
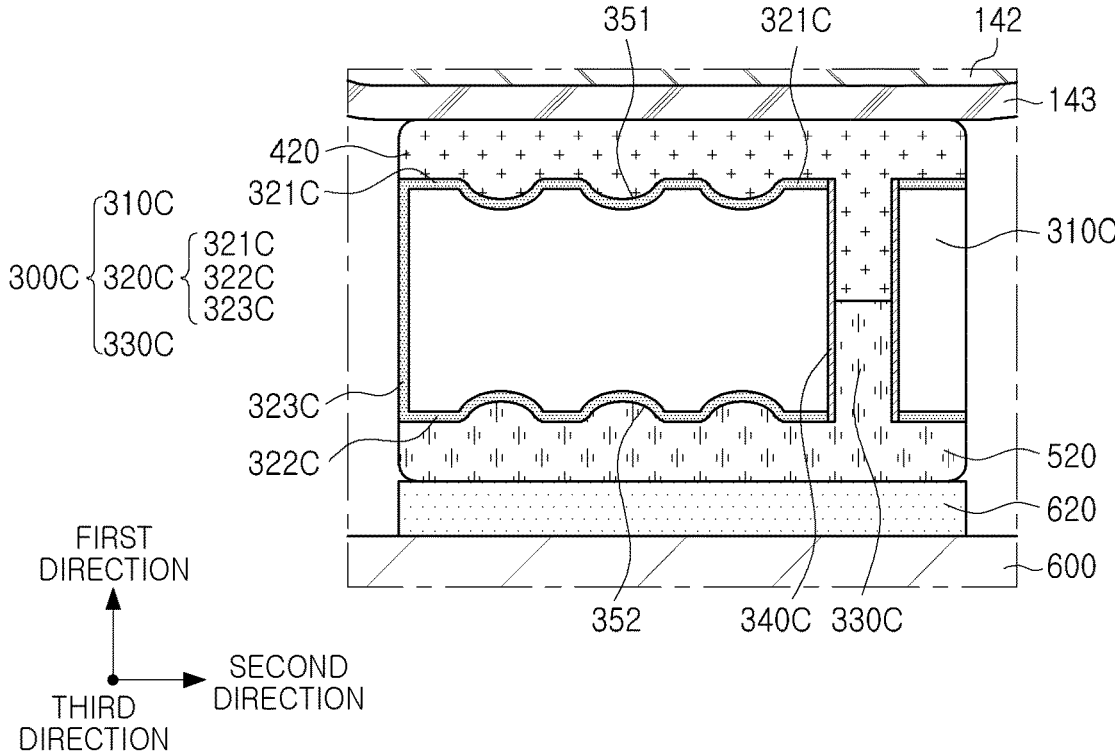
FIG. 10B is a partially enlarged view schematically illustrating a side of a second interposer of a composite electronic component according to a fourth example embodiment of the present disclosure mounted on a printed circuit board.
Figure 11:
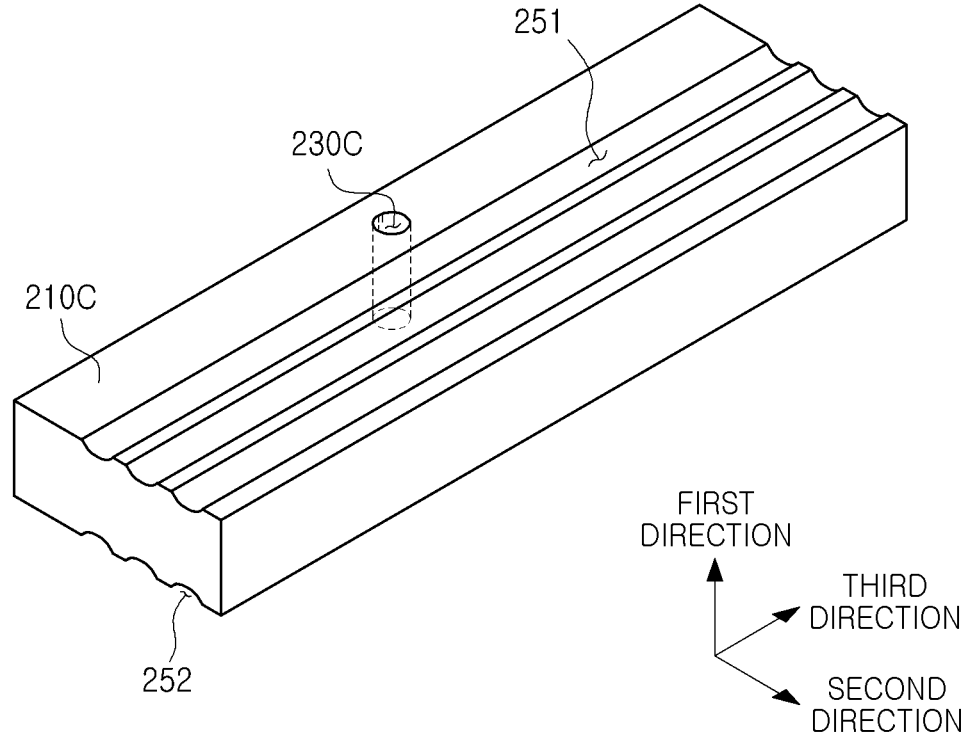
FIG. 11 is a perspective view schematically a first substrate of a composite electronic component according to the fourth example embodiment.

FIG. 10A is a partially enlarged view schematically illustrating a side of a first interposer of a composite electronic component according to a fourth example embodiment of the present disclosure mounted on a printed circuit board, and FIG. 10B is a partially enlarged view schematically illustrating a side of a second interposer of a composite electronic component according to a fourth example embodiment of the present disclosure mounted on a printed circuit board.

Referring to FIGS. 10A and 10B, a first interposer 200C may include, for example, a first substrate 210C, and a first electrode 220C including a first connection electrode 221C, a first mounting electrode 222C and a first linking electrode 223C. Furthermore, a second interposer 300C may include, for example, a second substrate 310C, and a second electrode 320C including a second connection electrode 321C, a second mounting electrode 322C and a second connection electrode 323C.

According to the fourth example embodiment of the present disclosure, the first interposer 200C may include a first connection groove portion 251 disposed on an upper surface of the first interposer and/or a first mounting groove portion 252 disposed on a lower surface of the first interposer 200C. Furthermore, the second interposer 300C may include a second connection groove portion 351 disposed on an upper surface of the second interposer and/or a second mounting groove portion 352 disposed on a lower surface of the second interposer 300C.

An interior of the connection groove portions 251 and 351 may be filled with conductive bonding agents 410 and 420, thereby improving bonding force between the multilayer ceramic capacitor and the interposers 200C and 300C. An interior of the mounting groove portions 252 and 352 may be filled with conductive mounting agents 510 and 520, thereby improving bonding force between the interposers 200C and 300C and electrode pads 610 and 620 of the printed circuit board 600.

Furthermore, in order to improve the mounting stability of composite electronic components, as illustrated in FIGS. 10A and 10B, the interposers 200C and 300C may include a plurality of connection groove portions 251 and 351 and a plurality of mounting groove portions 252 and 352. However, the present disclosure is not limited thereto.

In an example embodiment, the first interposer 200C may include a first via 230C penetrating through the first interposer in the first direction, and the second interposer 300C may include a second via 330C penetrating through the second interposer in the first direction. Furthermore, a first via electrode 240C may be disposed on an internal wall of the first via 230C, and a second via electrode 340C may be disposed on an internal wall of the second via 330C. Conductive bonding agents 410 and 420 and conductive mounting agents 510 and 520 may flow into the vias 230C and 330C through the via electrodes 240C and 340C. Accordingly, bonding force between the multilayer ceramic capacitor and the interposers 200C and 300C and bonding force between the interposers 200C and 300C and the electrode pads 610 and 620 of the printed circuit board 600 may be further improved.

A shape in which the vias 230C and 330C are disposed is not particularly limited, and for example, the first via 230C may be disposed to be biased toward an external surface Sout based on a center of the first interposer 200C in the second direction, and the second via 330C may be disposed to be biased toward an external surface based on a center of the second interposer 300C in the second direction. The vias 230C and 330C may be disposed adjacently to the external surfaces of the interposer 200C and 300C, thereby reducing ESL by reducing a distance in which electricity flows from the external electrode to the electrode pads 610 and 620.

The present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not denote the same example embodiment, and is provided to emphasize and explain different unique characteristics. However, the example embodiments presented do above not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, a meaning of being connected is a concept including not only directly connected but also indirectly connected through an adhesive layer or the like. Furthermore, a meaning of electrically connected is a concept including both physically connected and not connected. In addition, expressions such as first and second are used to distinguish one component from another, and do not limit the order and/or importance of the components. In some cases, a first component may be referred to as a second component without departing from the scope of rights, or similarly, the second component may be referred to as the first component.

What is claimed is:

1. A composite electronic component comprising:

a multilayer ceramic capacitor including a body including a dielectric layer and first and second internal electrodes alternately disposed with the dielectric layer interposed therebetween, the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively, and connected to the first and second internal electrodes, respectively;

a first interposer disposed on the first surface of the body and connected to the first external electrode; and a second interposer disposed on the first surface of the body and connected to the second external electrode, wherein the first interposer includes a first connection unit adjacent to the multilayer ceramic capacitor, a first mounting unit disposed below the first connection unit, a first connection via penetrating through the first connection unit, and a first mounting via penetrating through the first mounting unit, the second interposer includes a second connection unit adjacent to the multilayer ceramic capacitor, a second mounting unit disposed below the second connection unit, a second connection via penetrating through the second connection unit, and a second mounting via penetrating through the second mounting unit, the first connection via and the first mounting via are disposed so as not to overlap each other based on the first direction, and the second connection via and the second mounting via are disposed so as not to overlap each other based on the first direction.

2. The composite electronic component of claim 1, wherein the first connection unit includes a first connection substrate and a first connection electrode disposed above the first connection substrate and connected to the first external electrode, and the first mounting unit includes a first mounting substrate and a first mounting electrode disposed below the first mounting substrate, and the second connection unit includes a second connection substrate and a second connection electrode disposed above the second connection substrate and connected to the second external electrode, and the second mounting unit includes a second mounting substrate and a second mounting electrode disposed below the second mounting substrate.

3. The composite electronic component of claim 2, comprising: a first conductive bonding agent connecting the first external electrode and the first connection electrode, and a second conductive bonding agent connecting the second external electrode and the second connection electrode.

4. The composite electronic component of claim 3, wherein at least a portion of an interior of the first connection via is filled with the first conductive bonding agent, and at least a portion of an interior of the second connection via is filled with the second conductive bonding agent.

5. The composite electronic component of claim 2, wherein the first interposer includes a first linking electrode disposed on one side surface of the first interposer, the first linking electrode connecting the first connection electrode and the first mounting electrode, and the second interposer includes a second linking electrode disposed on one side surface of the second interposer, the second linking electrode connecting the second connection electrode and the second mounting electrode.

6. The composite electronic component of claim 2, wherein the first interposer includes a first intermediate electrode disposed between the first connection unit and the first mounting unit, and the second interposer includes a second intermediate electrode disposed between the second connection unit and the second mounting unit.

7. The composite electronic component of claim 1, wherein the first connection via penetrates through the first connection unit, and the second connection via penetrates through the second connection unit.

8. The composite electronic component of claim 1, wherein the first connection via does not penetrate through the first mounting unit, or the first mounting via does not penetrate through the first connection unit, and the second connection via does not penetrate through the second mounting unit, or the second mounting via does not penetrate the second connection unit.

9. The composite electronic component of claim 1, wherein the first connection via and the first mounting via are disposed in different positions in the second direction, and the second connection via and the second mounting via are disposed in different positions in the second direction.

10. The composite electronic component of claim 1, wherein the first connection via and the first mounting via are disposed in different positions in the third direction, and the second connection via and the second mounting via are disposed in different positions in the third direction.

11. The composite electronic component of claim 1, wherein a via electrode is disposed on an internal wall of at least one of the first connection via, the first mounting via, the second connection via, and the second mounting via.

12. The composite electronic component of claim 1, wherein the first interposer includes an internal surface and an external surface opposing each other in the second direction, and in the first and second directional cross-sections of the first interposer, the first connection via is disposed to be biased toward the external surface based on a center of the first connection unit in the second direction, and the first mounting via is disposed to be biased toward the internal surface based on a center of the first mounting unit in the second direction.

13. The composite electronic component of claim 12, wherein a distance in the second direction from the external surface to an internal wall of the first connection via may be within 0.15 mm, and a distance in the second direction from the internal surface to an internal wall of the first mounting via is within 0.15 mm.

14. A composite electronic component comprising:

a multilayer ceramic capacitor including a body including a dielectric layer and first and second internal electrodes alternately disposed with the dielectric layer interposed therebetween, and the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively;

a first interposer disposed on the first surface of the body and connected to the first external electrode through a first conductive bonding agent, the first interposer comprising a first connection substrate disposed above a first mounting substrate; and a second interposer disposed on the first surface of the body and connected to the second external electrode through a second conductive bonding agent, the second interposer comprising a second connection substrate disposed above a second mounting substrate, wherein the first interposer includes a first connection via penetrating through the first connection substrate and having a lower surface disposed on an upper surface of the first mounting substrate, and a first mounting via penetrating through the first mounting substrate and having an upper surface disposed on a lower surface of the first connection substrate, the second interposer includes a second connection via penetrating through the second connection substrate and having a lower surface disposed on an upper surface of the second mounting substrate, and a second mounting via penetrating through the second mounting substrate and having an upper surface disposed on a lower surface of the second connection substrate, at least a portion of the first connection via is filled with the first conductive bonding agent, but the first mounting via is not filled with the first conductive bonding agent, and at least a portion of the second connection via is filled with the second conductive bonding agent, but the second mounting via is not filled with the second conductive bonding agent.

15. The composite electronic component of claim 14, wherein the first interposer further comprises includes a first connection electrode disposed above the first connection substrate and connected to the first external electrode, and a first mounting electrode disposed below the first mounting substrate, and includes a first intermediate electrode disposed inside the first substrate between the first connection substrate and the first mounting substrate and connected to the lower surface of the first connection via and the upper surface of the first mounting via, and the second interposer further comprises includes a second connection electrode disposed above the second connection substrate and connected to the second external electrode, and a second mounting electrode disposed below the second mounting substrate, and includes a second intermediate electrode disposed inside the second substrate between the second connection substrate and the second mounting substrate and connected to the lower surface of the second connection via and the upper surface of the second mounting via.

16. The composite electronic component of claim 15, wherein the first conductive bonding agent is disposed in a space defined by an internal wall of the first connection via and the first intermediate electrode, and the second conductive bonding agent is disposed in a space defined by an internal wall of the second connection via and the second intermediate electrode.

17. A composite electronic component comprising:

a multilayer ceramic capacitor including a body including a dielectric layer and first and second internal electrodes alternately disposed with the dielectric layer interposed therebetween, and the body including a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction, and first and second external electrodes disposed on the third surface and the fourth surface, respectively;

a first interposer disposed on the first surface of the body and connected to the first external electrode through a first conductive bonding agent; and a second interposer disposed on the first surface of the body and connected to the second external electrode through a second conductive bonding agent, wherein the first interposer includes a first via extending from an upper surface of the first interposer facing the first surface of the body and a second via extending from a lower surface of the first interposer opposing the upper surface of the first interposer, the first via and the second via being spaced apart from each other, the second interposer includes a third via extending from an upper surface of the second interposer facing the first surface of the body and a fourth via extending from a lower surface of the second interposer opposing the upper surface of the second interposer, the third via and the fourth via being spaced apart from each other, at least a portion of the first via is filled with the first conductive bonding agent, such that the first conductive bonding agent is disposed on a level above the lower surface of the first interposer to be closer to the first surface of the body than the lower surface of the first interposer, and at least a portion of the third via is filled with the second conductive bonding agent, such that the second conductive bonding agent is disposed on a level above the lower surface of the second interposer to be closer to the first surface of the body than the lower surface of the second interposer.

18. The composite electronic component of claim 17, wherein the first via and the second via are connected to each other, and the third via and the fourth via are connected to each other.

19. The composite electronic component of claim 17, wherein the first interposer includes a groove portion disposed on at least one of the upper surface and the lower surface of the first interposer, and the second interposer includes a groove portion disposed on at least one of the upper surface and the lower surface of the second interposer.

20. The composite electronic component of claim 17, wherein the first via and the second via are spaced apart from each other in the second direction, and the third via and the fourth via are spaced apart from each other in the second direction.

\* \* \* \* \*